United States Patent [19]

Hallstein

[11] 4,343,327

[45] Aug. 10, 1982

[54] PRESSURE RESPONSIVE, MANUALLY OPENING VALVE

[75] Inventor: Robert R. Hallstein, Danning, Calif.

[73] Assignee: The United States of America as represented by the Secretary of the Navy, Washington, D.C.

[21] Appl. No.: 167,508

[22] Filed: Jul. 11, 1980

[51] Int. Cl.³ ............................................. F16K 17/00
[52] U.S. Cl. ...................................... 137/464; 137/494
[58] Field of Search .................................. 137/464, 494

[56] References Cited

U.S. PATENT DOCUMENTS

| | | | |
|---|---|---|---|
| 354,017 | 12/1886 | Helm | 137/464 |
| 1,247,149 | 11/1917 | Ray | 137/464 |
| 2,147,850 | 2/1939 | MacLean | 137/464 X |
| 2,637,331 | 5/1953 | Sullivan | 137/464 X |
| 2,824,572 | 2/1958 | Smith | 137/464 |
| 2,871,826 | 2/1959 | Edmund | 137/464 |
| 3,661,173 | 5/1972 | Bauer | 137/464 X |

*Primary Examiner*—Harold W. Weakley
*Attorney, Agent, or Firm*—R. F. Beers; L. A. Marsh

[57] ABSTRACT

A pressure-responsive valve operable to close when the pressure falls below a predetermined minimum level. After closure, the valve must be manually reset to its open position where it is retained by the pressure of the fluid against a diaphragm positioned within a chamber adjacent the valve. When used in conjunction with a oil-fired boiler, the valve prevents boiler flareback by closing when the pressure falls below a predetermined minimum level and by requiring a monitored, manual reopening, thereby preventing undesired ignition.

11 Claims, 3 Drawing Figures

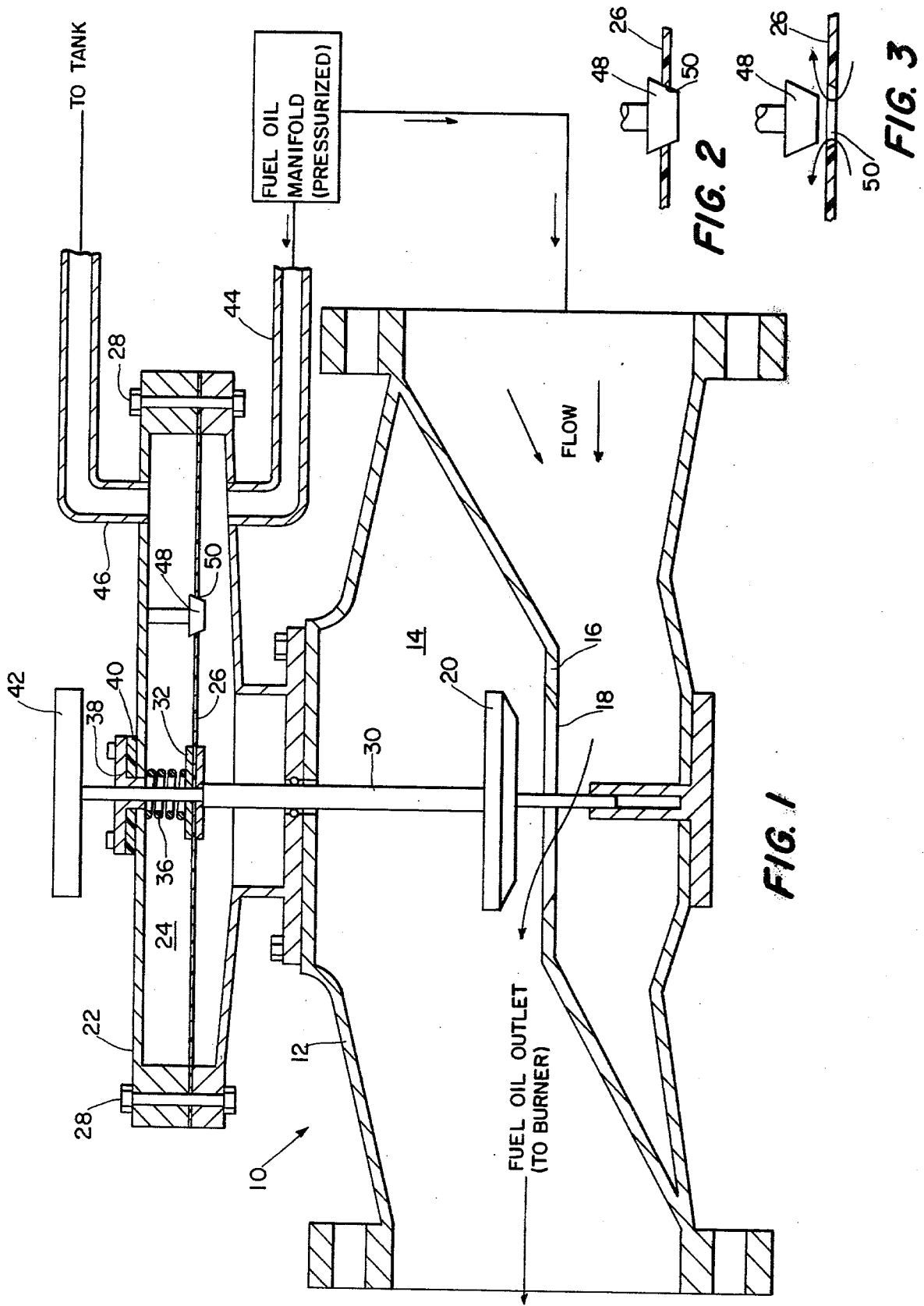

PRESSURE RESPONSIVE, MANUALLY OPENING VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to automatically closing valves which respond to pressure drops and in particular to valves adapted to be used between a fuel oil manifold and the fuel oil burner in a boiler, such as those aboard a ship. At present, when oil pressure to a boiler subsides below a predetermined level and the fires goes out, the unmonitored resurgence of oil pressure results in the fuel oil being sprayed on the hot brickwork and caused to ignite; this is generally known as "boiler flare-back". Although the concept of the present invention is particularly suited for use with fuel oil burners, the structure is not limited to one particular application and may be utilized in devices requiring a valve closure when system pressure drops to a predetermined minimum, with manual reset necessary for the reopening of the valve. A general example of pressure-responsive valves is disclosed in U.S. Pat. No. 2,749,080 to Griswold. Griswold reveals the utilization of a diaphragm positioned in a secondary chamber which is resiliently biased to close a valve whenever fluid pressure against the diaphragm falls below a predetermined level. As distinguished from the present invention, however, a resurgence of pressure will re-open the valve. Such a valve is not suited for applications requiring monitoring prior to reopening as in fuel oil burners.

SUMMARY OF THE INVENTION

The design of the present invention is superior to pressure-responsive valves in the prior art since not only is the valve maintained in an open position in response to maintenance of pressure at or above a given level, but once the valve is closed it must be reopened manually, thereby preventing unmonitored flow. The present invention comprises two separate chambers, each with a single valve. A diaphragm in the second chamber is operatively connected to the primary valve in the first chamber and maintains the primary valve in an open position. The secondary valve is positioned so as to close an aperture in the diaphragm when fluid pressure is maintained above a predetermined minimum. When fluid pressure on the diaphragm is decreased below a predetermined level, the diaphragm moves away from the secondary valve allowing fluid to pass therethrough. To reopen the valve, the diaphragm must be reset manually so that the primary valve can not be reopened by a resurgence in fluid pressure.

OBJECTS OF THE INVENTION

It is therefore an object of this invention to provide a reliable pressure responsive valve.

A further object of the present invention is to provide a pressure-responsive valve which must be manually reset after closure.

Another object of the present invention is to provide a pressure-responsive valve which remains in an open position at and above a minimum pressure and automatically, quickly closes when the pressure drops below a predetermined minimum.

Still another object of the present invention is to provide a pressure responsive valve which is manually opened by a pulling action and which is spring-loaded so as to automatically close when the fluid pressure drops below a predetermined minimum.

Yet another object of the present invention is to provide a pressure-responsive valve which is maintained in a first open position by a diaphragm construction when fluid pressure is at or above a predetermined minimum and which is spring-loaded to close to a second position when the fluid pressure drops below the predetermined minimum.

Other objects and many of the attendant advantages of the present invention will become readily apparent as the invention becomes better understood by reference to the following detailed description along with the appended claims, when considered in conjunction with the accompanying drawings.

BRIEF DESCRIPTION OF THE DRAWINGS

FIG. 1 is a schematic cross-sectional view of the preferred embodiment of the pressure-responsive valve of the present invention.

FIG. 2 is a schematic close-up view of a portion of FIG. 1 showing the diaphragm in a mating relationship with the secondary valve in a closed position.

FIG. 3 is a schematic close-up view of the same portion of FIG. 1 showing the diaphragm disengaged from the secondary valve in an open position.

DESCRIPTION OF THE PREFERRED EMBODIMENT

Referring now to the drawings, wherein like reference characters designate like or corresponding parts throughout the three views, the preferred embodiment of FIG. 1 shows a pressure responsive valve assembly 10 having a first housing 12 defining a first chamber 14 which is divided by a wall 16 containing a primary passage 18 with a primary valve 20 adapted to be seated therein. As depicted by the arrows, fuel oil from the fuel oil manifold passes through primary passage 18 to the burner (not shown) when primary valve 20 is in its open position as seen in FIG. 1. For the sake of brevity, the pipe connections to both sides of housing 12 have not been shown; however, bolted or screw threaded connections could be utilized. Attached to the top of first housing 12 (as seen in FIG. 1) is second housing 22 defining an isolated second chamber 24. A series of bolts or the like may be used to provide a secure connection between primary housing 12 and secondary housing 22. A diaphragm 26, which is made of resilient material and is pressure-responsive, extends across the middle portion of second chamber 24 and is removably positioned between opposing sections of second housing 22 by bolts 28 in a sealing manner. Diaphragm 26 is operatively connected to primary valve 20 by stem 30 which assists in controlling valve 20 such that when diaphragm 26 moves downward (as seen in FIG. 1), primary valve 20 moves in the same direction. Support washers 32 encircling neck portion 34 of stem 30 are used to rigidly connect diaphragm 26 to stem 30 but, depending upon the material strength of diaphragm 26, washers 32 may be omitted. Diaphragm 26 as well as stem 30 and primary valve 20 are biased downward (as seen in FIG. 1) by spring 36, which is compressed between housing 22 and washers 32. The force of spring 36 may be adjusted by various means readily apparent to those skilled in the art; including adjusting spring tension. Although a coil spring in compression is preferred due to the simplicity of construction and operation, various alternate biasing means could be utilized such as a leaf spring, resilient supports: or biasing means incorporated into diaphragm 26. Collar portion 38 encircles neck 34 in sliding, sealed relation and is in turn sealed to housing 22 by a seal washer 40 or the like. A handle 42 is rigidly connected to stem 30 and provides for manual movement of stem 30 in a manner to be later described. Fluid pressure is exerted on diaphragm 26 by fuel oil entering into the second chamber 24 through inlet tube 44, which is part of a sensor line running from the fuel oil manifold, or from a place in the flow line where the pressure may be accurately sensed. Fuel oil exits second chamber 24 through outlet tube 46 for return to an unpressurized container such as the fuel tank. Tubes 44, 46 may be connected to second housing 22 by a variety of attachment means including a threaded connection or welding. Secondary valve 48 is rigidly connected to second housing 22 and mates with aperture 50 in diaphragm 26 when the diaphragm 26 is in the position shown in FIG. 1; i.e. under the influence of pressure exerted by fuel oil entering through inlet tube 44. A close-up view of this arrangement is shown in FIG. 2. FIG. 3, however, is a close-up view of secondary valve 48 showing diaphragm 26 after it has been moved downward by the force of spring 36 (not shown in FIGS. 2 and 3) in a manner to be later described. Although secondary valve 48 is shown rigidly positioned on a wall of second housing 22, alternate constructions may be utilized which allow relative movement between diaphragm 26 and stationary valve 48 when fluid pressure drops below a predetermined level thereby allowing fluid to pass through aperture 50. For example, in a less simplistic construction, valve 48 could be biased so as to become unseated when fluid pressure drops. However, the preferred construction is unique in that it provides for the simultaneous positioning of (1) diaphragm 26 relative to stationary valve 48 and (2) primary valve 20 relative to primary passage 18. Furthermore, once the positioning takes place, primary valve 20 remains substantially stationary, thereby allowing a substantially constant flow rate. Still further, once the fluid pressure drops to a predetermined level, which is dependent upon the force of spring 36, the passage of fluid through aperture 50 decreases pressure beneath diaphragm 26 and allows nearly instantaneous seating of primary valve 20 within primary passage 18 by the action of spring 36, thereby stopping the primary flow. In operation, once the pressure of fluid (i.e. fuel oil) is above a predetermined level, handle 42 is withdrawn to the position shown in FIG. 1 such that primary valve 20 is separated from passage 18 allowing fuel oil to pass therethrough and stationary valve 48 is seated within aperture 50 thereby preventing fuel oil from passing therethrough. As a result of the pressure of fuel oil on only one side of diaphragm 26, the force of coil spring 36 is balanced and primary valve 20 remains open. However, once the pressure of the fuel oil falls below a predetermined level so that the pressure exerted on diaphragm 26 does not balance the force of spring 36, diaphragm 26 moves to the position depicted in FIG. 3, thereby allowing the release of fluid pressure (i.e. fuel oil) through aperture 50 such that stem 30 will instantaneously move downward thereby seating primary valve 20 within passage 18 to substantially stop all flow of fuel oil. Should there be a resurgence of fuel oil pressure in the manifold, primary valve 20 will remain substantially closed as the fuel oil will not act on diaphragm 26 due to the escape of fluid through aperture 50. However, once handle 42 is manually reset to the position shown in FIG. 1, stationary valve 48 will once again seal aperture 50 thereby maintaining a fluid pressure sufficient to retain diaphragm 26 and primary valve 20 in the respective positions shown in FIG. 1.

Although a valve 20 having a closure wall positioned perpendicular to stem 30 is shown in FIG. 1, those skilled in the art can readily appreciate that a variety of closures could be utilized including gate type valves having the closure wall extending along the axis of movement, i.e. perpendicular to the flow, whereupon the closing action would be similar in effect to that of a sliding door or gate. Likewise, globe, needle or ball valves could be used.

Obviously, many modifications and variations of the present invention are possible in the light of the above teachings. It is therefore to be understood that, within the scope of the appended claims, the invention may be practiced otherwise than as specifically described.

What is claimed and desired to be secured by Letters Patent of the United States is:

1. A valve device for regulating the flow of fluids from a supply container to a utilizing means comprising:
   first chamber means for directing the flow of fluids;
   primary inlet means for delivering fluids into said chamber means;
   primary outlet means for delivery fluids from said chambers means;
   aperture means in said first chamber means for allowing the passage of fluids from said inlet means to said outlet means;
   primary valve means for regulating the flow of fluids through said aperture means, said primary valve means substantially closing said aperture means when in its closed position;
   control means for moving said primary valve means from an open to a closed position, said control means including reset means to manually reset said primary valve means to an open position, pressure-responsive means to maintain said primary valve means in said open position when the fluid pressure is greater than a predetermined amount and means forming a second chamber isolated from said first chamber means, said pressure-responsive means being located in said second chamber means, said second chamber means including a secondary inlet and a secondary outlet and means forming a secondary valve, said pressure-responsive means including a diaphragm extending substantially across said second chamber, said diaphragm having port means therein in substantial alignment with said secondary valve means for allowing fluid to pass therethrough from said secondary inlet to said secondary outlet, said secondary valve means being located substantially centrally in said diaphragm between said primary valve means and the exterior of said second chamber and positioned so as to close said port means when said fluid pressure from said secondary inlet is above a predetermined pressure and to open said port means when said fluid pressure is below said predetermined pressure, thereby allowing fluid to flow from said secondary inlet to said secondary outlet through said port means, and thereby permitting said primary valve means to close, and when said primary valve means is manually set to an open position by said reset means said primary valve means is maintained in said open position by said pressure-responsive means provided said fluid pressure is at or above said predetermined pressure.

2. The invention set forth in claim 1 wherein said pressure-responsive means further includes spring means for simultaneously biasing said diaphragm away from said secondary valve and biasing said primary valve means towards said closed position.

3. The invention as set forth in claims 1 or 2 wherein said secondary valve means is stationary relative to said second chamber means.

4. The invention as set forth in claim 1 wherein said primary inlet means and said secondary inlet are connected to a common source and the pressures of the fluids in each are substantially equal.

5. The invention as set forth in claim 4 wherein the secondary outlet is connected to a low pressure source.

6. The invention as set forth in claims 5 or 2 wherein said reset means, said diaphragm, and said primary valve means are interconnected by movable rod means for effecting an operative relationship.

7. The invention as set forth in claim 6 wherein said reset means is a manually operative handle mounted on said rod means.

8. The invention as set forth in claim 2 wherein said spring means is adjustable so that said diaphragm may be set to close at various predetermined pressures.

9. A valve device for regulating the flow of pressurized fluid through a main valve controlling fluid flow between inlet and outlet ports in a first housing means comprising:

pressure-responsive means for maintaining the main valve in an open position when the fluid pressure is above a predetermined level, said pressure-responsive means including secondary valve means for closure of the main valve when fluid pressure drops below a predetermined level;

aperture means in said pressure-responsive means adapted to coact with said secondary valve means to prevent automatic reopening of the valve in response to a resurgence of fluid pressure;

reset means for providing manual resetting of the valve to the open position;

second housing means for containing said pressure-responsive means, said second housing means having an inlet and outlet port, fluid flow between which is controlled by coaction of said aperture means and said secondary valve means, and said secondary valve means being located substantially centrally in a diaphragm within second housing means between said main valve means and the exterior of said second housing means, said pressure-responsive means closing said valve when fluid pressure falls below a predetermined level and when it is thereafter desired that the valve be opened, said valve manually reopened by said reset means whereupon said valve is retained in the open position by said pressure-responsive means as long as fluid pressure is above the predetermined level.

10. The invention as claimed in claim 9 wherein said pressure-responsive means further includes spring means for biasing said pressure-responsive means in a direction opposite to that imposed on said pressure-responsive means by the fluid pressure, said spring means also acting to bias said valve to a closed position.

11. The invention as claimed in claim 10 wherein said pressure-responsive diaphragm means is flexed towards said secondary valve means by the presence of fluid pressure and away from said secondary valve means by the substantial lessening of fluid pressure.

* * * * *

UNITED STATES PATENT OFFICE
CERTIFICATE OF CORRECTION

Patent No. 4,343,327            Dated August 10, 1982

Inventor(s) Robert R. Hallstein

It is certified that error appears in the above-identified patent and that said Letters Patent are hereby corrected as shown below:

On the cover sheet please delete

"[73] Assignee: The United States of America as represented by the Secretary of the Navy, Washington, D. C."

Signed and Sealed this

Second Day of November 1982

[SEAL]

Attest:

GERALD J. MOSSINGHOFF

Attesting Officer      Commissioner of Patents and Trademarks